United States Patent [19]

Yu

[11] Patent Number: 4,611,677

[45] Date of Patent: Sep. 16, 1986

[54] SHOCK PROOF SCALE

[75] Inventor: George T. Yu, Petaluma, Calif.

[73] Assignee: National Controls, Inc., Santa Rosa, Calif.

[21] Appl. No.: 709,110

[22] Filed: Mar. 7, 1985

[51] Int. Cl.[4] .................... G01G 21/10; G01G 21/12; G01G 3/14

[52] U.S. Cl. .................................. 177/187; 177/211; 177/255; 177/DIG. 9

[58] Field of Search .............. 177/132, 134, 211, 187, 177/255, 229, DIG. 9

[56] References Cited

U.S. PATENT DOCUMENTS 3,658,143  4/1972  Schwartz ..................... 177/187 X
3,894,595  7/1975  Czyryk ......................... 177/255 X
4,064,955 12/1977  Dyck ............................ 177/255 X
4,489,797 12/1984  Gordon ........................ 177/187 X Primary Examiner—Joseph W. Hartary
Assistant Examiner—Patrick W. Foster
Attorney, Agent, or Firm—Flehr, Hohbach, Test, Albritton & Herbert

[57] ABSTRACT

Electronic weighing scale having a load bridge with torsion bars for transmitting a load from a platform to a load cell. The torsion bars flex torsionally to protect the load cell from overloading and shock loading. The platform rests loosely on the load bridge and is freely displaceable to protect the load cell from side loading or other impacts on the platform.

21 Claims, 4 Drawing Figures

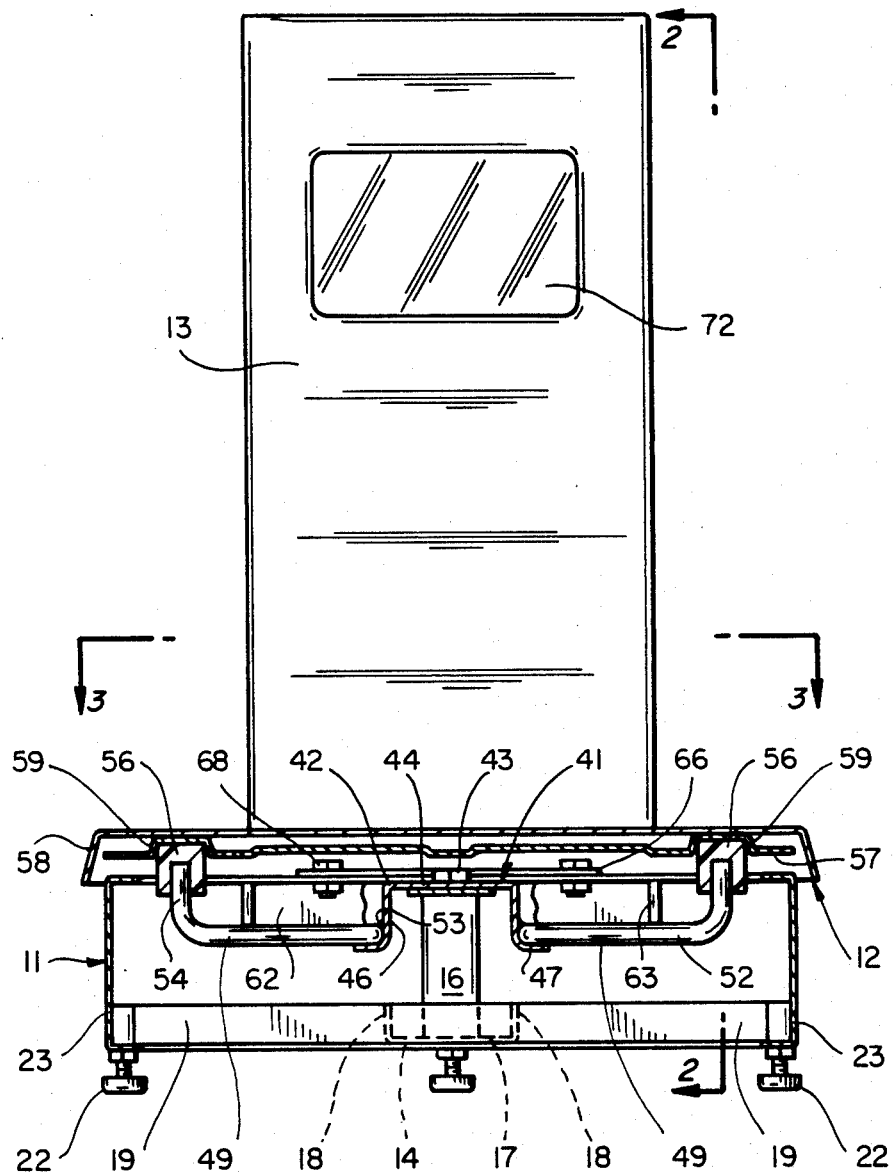
FIG_1

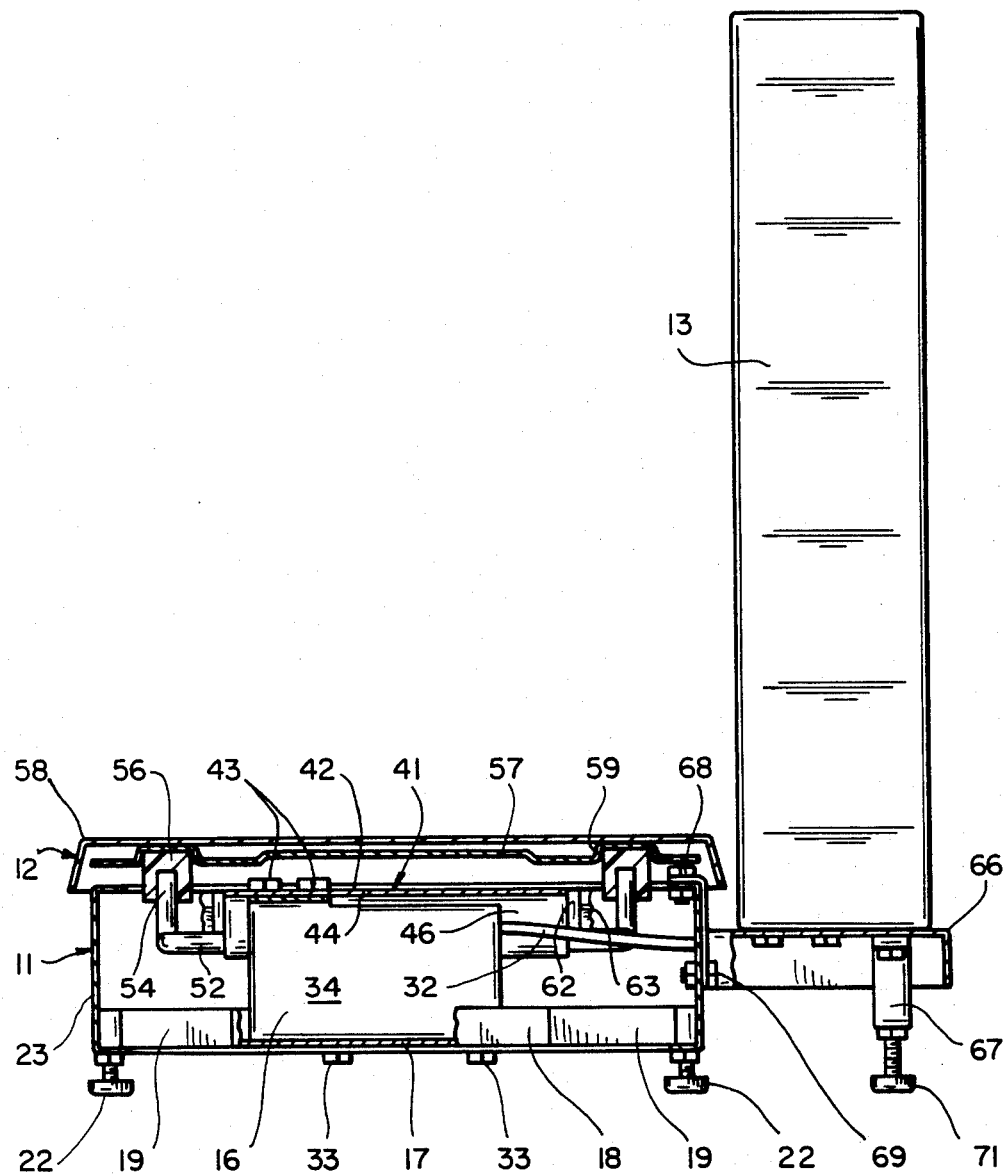
FIG_2

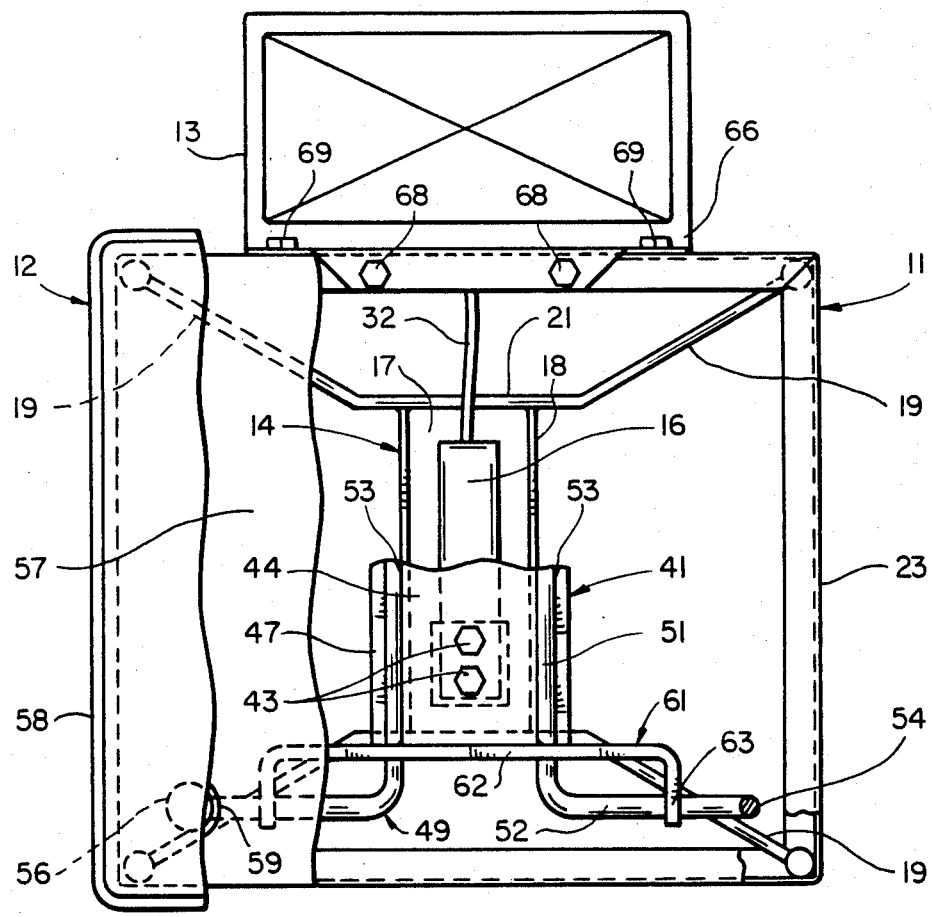
FIG_3
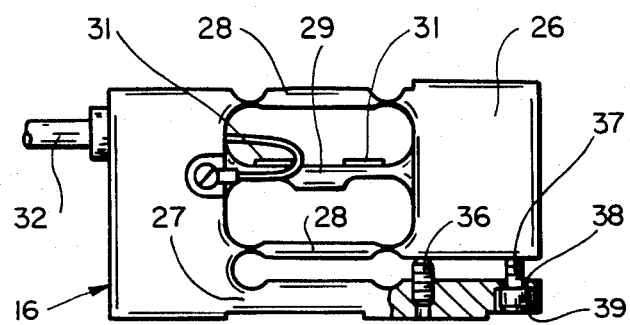
FIG_4

SHOCK PROOF SCALE

This invention pertains generally to weighing scales and more particularly to an electronic scale in which the load to be weighed is applied directly to a load cell or force transducer.

Heretofore, electronic scales have been provided for weighing loads and performing various calculations based upon the weight of the load. For example, computing scales are utilized at the point of sale to determine the price of a product, computing postal scales are utilized to determine the cost of mailing a package or letter, and counting scales are utilized to determine the number of pieces in a load. Examples of such scales are found in U.S. Pat. Nos. 3,951,221 and 4,043,412.

In some scales, including those found in U.S. Pat. Nos. 3,951,221 and 4,043,412, the load receiving element is mounted directly on and supported by the load cell. This eliminates the need for a lever system and provides a simple, economical scale structure. Such scales do, however, have certain limitations and disadvantages in that load cells are relatively fragile and can be damaged by abuse such as overloading, shock loading, side loading or lifting the scale by a platform attached to the load cell.

It is in general an object of the invention to provide a new and improved electronic weighing scale.

Another object of the invention is to provide an electronic weighing scale of the above character which is relatively immune to the type of abuse which might otherwise damage a load cell in an electronic scale.

These and other objects are achieved in accordance with the invention by providing an electronic weighing scale having a platform, a load cell for providing an output signal corresponding to the load applied thereto, and a load bridge which mounts the platform on the load cell. The load bridge has a plurality of torsion bars through which the load is applied to the load cell, and these bars flex torsionally in response to the applied load to protect the load cell from overloads and shock loads. The platform is mounted loosely on the load bridge and is freely displaceable therefrom to protect the load cell from side loads or impacts on the side of the platform.

FIG. 1 is a front elevational view, partly sectioned and broken away, of one embodiment of a scale according to the invention.

FIG. 2 is a cross-sectional view taken along line 2—2 in FIG. 1.

FIG. 3 is a cross-sectional view taken along line 3—3 in FIG. 1.

FIG. 4 is a side elevational view, partly broken away, of the load cell in the scale of FIG. 1.

As illustrated in the drawings, the scale has a generally rectangular base 11 on which a load receiving platform 12 is mounted. A display column extends upwardly at the rear of the base.

The base includes a central support plate 14 on which a load cell 16 is mounted. The support plate is a generally u-shaped member having a generally rectangular central section 17 with upstanding flanges 18 extending along opposite sides of the central section. The support plate is supported by horizontal legs 19 which extend diagonally between the support plate and the corners of the base. The legs have central sections 21 which extend across the front and rear ends of the support plate and are rigidly affixed thereto, for example by welding. The outer ends of the legs are provided with adjustable mounting feet 22 which rest upon a support surface (not shown). The base is open at the top and bottom, and the sides are enclosed by a peripheral shroud 23.

Load cell 16 is a bending beam load cell of the type described in U.S. Pat. No. 4,107,985. This load cell has a load receiving arm 26 connected to a base 27 by parallel flexured arms 28. A load beam 29 extends between the load arm and base, and strain gauge elements 31 are mounted on the beam. Electrical connections to the strain gauges are made by a cable 32. Base 27 is mounted on support plate 14 and secured thereto by screws 33. The application of a load to arm 26 causes load beam 29 to bend, and the stress produced by this bending is monitored to determine the magnitude of the load. In one presently preferred embodiment, the load cell base, arms and beam are fabricated as a unitary structure from a block of stainless steel or other suitable material, and the sides of the load cell are closed by side plates 34 affixed to base 27.

The flexures in arms 28 are relatively fragile, and they can be damaged by excessive vertical movement of load arm 26. To prevent such damage, a set screw 36 is threadedly mounted in base 27 and abuts against the lower side of load arm 26 to form an adjustable stop which limits downward movement of the load arm. A cap screw 37 is threadedly mounted in the lower side of the load arm, with the shank of the screw passing through a clearance hole 38 in the base and the head of the screw being received in a counterbore or socket 39 to form an adjustable stop for limiting upward movement of the load arm.

A load bridge 41 mounts platform 12 on load cell 16. The load bridge comprises a support head 42 which is rigidly affixed to the load receiving arm 26 of load cell 16 by screws 43. The support head is a generally u-shaped member having a rectangular central section 44 with a pair of depending flanges 46 extending along opposite sides of the central section. Horizontal flanges 47 extend outwardly from the lower edges of the side flanges.

The load bridge also includes a pair of generally u-shaped torsion bars 49 through which loads are transferred from the platform to the load cell. Each of the torsion bars has a central arm 51 and a pair of load receiving arms 52 which are generally perpendicular to the central arm and extend outwardly in a horizontal direction from the ends of the central arms. The central arms of the torsion bars are affixed to support head 42 by plug welds 53 positioned toward the centers of the central arms at the junctions of flanges 46, 47. The torsion bars are thus rigidly affixed to the support head, yet free to flex torsionally about the axes of the central arms when a load is applied to the outer arms.

The end portions 54 of outer arms 52 are bent to extend in an upward direction, and resilient end caps 56 are mounted on the ends of these arms.

Platform 12 rests upon the end caps at the outer ends of the torsion bars and is freely displaceable therefrom. The platform includes a generally rectangular plate 57 which rests on the torsion bars and a skirted shroud 58 which rests on the plate. End caps 56 are loosely received in recessed areas or dimples 59 formed in plate 57.

Means is provided for pre-loading the torsion bars in the absence of a load on platform 12. This means includes a pair of u-shaped stops 61 having central arms 62 affixed to the front and rear ends of support head 42 and forwardly and rearwardly extending arms 63 at the outer ends of the central arms. The lower sides of arms 63 abut against the upper surfaces of the outer arms 52 of the torsion bars and hold these arms in a position which produces a pre-loading torsion in the central arms 51 of the torsion bars.

Display column 13 is supported at the rear of base 11 by a mounting bracket 66 and a support leg 67. The mounting bracket is secured to the rear wall of shroud 23 by bolts 68, 69, and leg 67 has an adjustable foot 71 which rests on the same supporting surface as feet 22.

Column 13 has electronic circuitry (not shown) which processes the signals from load cell 16 to determine the weight of a load applied to the platform. A display window 72 is provided in the front wall of the column, and information such as the weight of the load is displayed in this window.

Operation and use of the scale are as follows. A load to be weighed is placed on platform 12 and transmitted to load cell 16 by load bridge 41. As the load is applied, torsion bars 49 flex about the axes of central arms 51, thereby isolating the load cell from overloads and shock loading. Resting freely on the outer ends of the torsion bars, platform 12 is easily dislodged by side loads or impacts upon the platform, thereby further protecting the load cell. The load cell is further protected from overloads by stop 36, and it is also protected from negative loads by the loosely mounted platform and by stop 37. In the event that someone attempts to lift the scale by the platform, the platform will separate from the load bridge. In the event that someone attempts to lift the scale by the load bridge, stop 37 will limit the upward travel of load arm 26 to an amount which will not damage the load cell.

It is apparent from the foregoing that a new and improved scale has been provided. While only one presently preferred embodiment has been described in detail, as will be apparent to those familiar with the art, certain changes and modifications can be made without departing from the scope of the invention as defined by the following claims.

I claim:

1. In an electronic weighing scale: a load cell which provides an output signal corresponding to the load applied thereto, a load bridge mounted on the load cell having a plurality of torsion bars through which a load is applied to the load cell, said torsion bars flexing torsionally to protect the load cell from shock loading and overloading, and a load receiving platform mounted on the load bridge and being freely displaceable therefrom to protect the load cell from side loading.

2. The electronic weighing scale of claim 1 wherein the torsion bars have central arms connected to the load cell and load receiving arms which extend from the central arms and receive the platform in such manner that the central arms flex torsionally about their axes when a load is placed on the platform.

3. The electronic weighing scale of claim 2 including stops which engage the load receiving arms and hold said arms in a position which produces a preloading torsion in the central arms when there is no load on the platform.

4. The electronic weighing scale of claim 2 wherein the platform comprises a horizontally extending member which rests on the load receiving arms of the load bridge.

5. The electronic weighing scale of claim 4 wherein the outer ends of the load receiving arms have upwardly extending portions, and the platform has recessed areas on its underside in which the upwardly extending portions are loosely received to support the platform on the load receiving arms.

6. The electronic weighing scale of claim 5 including resilient pads interposed between the upwardly extending portions of the load receiving arms and the recessed areas in which the upwardly extending portions are received.

7. The electronic weighing scale of claim 1 wherein the load cell has a movable input member to which the load is applied and means for limiting the movement of said member to prevent damage to the load cell.

8. In an electronic weighing scale: a horizontally extending platform for receiving a load to be weighed, a load cell which produces an output signal corresponding to the load applied thereto, and a load bridge mounting the platform on the load cell, said load bridge comprising a support head mounted on the load receiving member of the load cell and a pair of generally U-shaped torsion bars each having a central arm affixed to the support head and a pair of load receiving arms which extend outwardly from the central arm and receive the platform in supporting relationship such that loads applied to the platform are transferred to the load cell through the torsion bars with the central arms flexing torsionally about their axes to protect the load cell from overloading and shock loading.

9. The electronic weighing scale of claim 8 wherein the load bridge includes rigid stops affixed to the support head which engage the upper sides of the load receiving arms and hold said arms in a position which produces a preloading torsion in the torsion bars with no load on the platform.

10. The electronic weighing scale of claim 8 wherein the platform rests loosely on the load receiving arms and is freely displaceable therefrom to protect the load cell from impacts on the platform.

11. The electronic weighing scale of claim 10 wherein the outer end portions of the load receiving arms extend in an upward direction and are received in recessed areas on the underside of the platform.

12. The electronic weighing scale of claim 11 including resilient end caps mounted on the end portions of the load receiving arms with the platform resting thereon.

13. The electronic weighing scale of claim 8 including means for limiting movement of the load receiving member of the load cell in a direction opposite to the direction in which the member normally moves in response to a load on the platform.

14. In an electronic weighing scale: a load cell which produces an output signal corresponding to the load applied thereto, a load bridge having a pair of outwardly extending arms for applying loads to the load cell, and a platform resting loosely on the arms of the load bridge and being freely displaceable in the event of an impact on the platform.

15. The electronic weighing scale of claim 14 wherein the outer ends of the load bridge arms extend in an upward direction and are received in recessed areas on the underside of the platform.

16. The electronic weighing scale of claim 15 including resilient end caps mounted on the end portions of the load bridge arms, with the platform resting thereon.

17. The electronic weighing scale of claim 14 wherein the load bridge includes torsion bars through which a load received on the platform is applied to the load cell, said torsion bars flexing torsionally in response to the load to protect the load cell from overloading and shock loading.

18. The electronic weighing scale of claim 14 wherein the load cell has an input member which is displaced downwardly by a load applied to the platform, and means limiting upward movement of the input member to a distance which will not damage the load cell.

19. In an electronic weighing scale: a load receiving member, a load cell which provides an output signal corresponding to the load applied thereto, and a torsion bar having a first arm portion affixed to the load cell and a second arm portion extending at an angle from the first arm portion for transferring a load from the load receiving member to the load cell, the first arm portion being free to flex torsionally about its axis when the load is applied to the second arm portion.

20. The electronic weighing scale of claim 19 wherein the load receiving member comprises a platform which rests loosely on the second arm portion of the torsion bar and is freely displaceable therefrom to protect the load cell from side loading.

21. In an electronic weighing scale: a load receiving member, a load cell which provides an output signal corresponding to the load applied thereto, and a torsion member for transferring a load from the load receiving member to the load call and flexing torsionally to protect the load cell from shock loading and overloading of the platform.

* * * * *